United States Patent [19]
Park

[11] Patent Number: 5,924,782
[45] Date of Patent: Jul. 20, 1999

[54] COMPUTER HAVING PROTECTING MEANS FOR PERIPHERAL EQUIPMENT

[75] Inventor: Sang-Seok Park, Suwon, Rep. of Korea

[73] Assignee: SamSung Electronics Co., Ltd., Suwon, Rep. of Korea

[21] Appl. No.: 08/814,884

[22] Filed: Mar. 12, 1997

[30] Foreign Application Priority Data

Apr. 3, 1996 [KR] Rep. of Korea ................ 96-10016

[51] Int. Cl.$^6$ ................................................ A47B 96/00
[52] U.S. Cl. ..................... 312/328; 16/342; 220/242; 220/335; 49/381; 312/223.2; 312/319.2
[58] Field of Search ........................... 361/681, 682, 361/683, 724; 16/342, 334, 341; 312/223.2, 138.1, 327, 328, 319.2, 222, 405, 326, 329; 220/318, 242, 335, 337; 126/191, 194; 49/381

[56] References Cited

U.S. PATENT DOCUMENTS

| | | | |
|---|---|---|---|
| 1,555,044 | 9/1925 | Walker | 126/191 |
| 4,096,602 | 6/1978 | Nelson | 126/194 X |
| 5,052,078 | 10/1991 | Hosoi | 361/681 X |
| 5,068,765 | 11/1991 | Nimpoeno | 16/334 X |
| 5,109,573 | 5/1992 | Sherman | 16/342 X |
| 5,255,965 | 10/1993 | Chen et al. | 312/328 X |
| 5,351,176 | 9/1994 | Smith et al. | 361/681 |
| 5,423,605 | 6/1995 | Liu . | |
| 5,483,981 | 1/1996 | Vandromme et al. | 220/335 X |
| 5,557,499 | 9/1996 | Reiter et al. . | |
| 5,574,625 | 11/1996 | Ohgami et al. . | |
| 5,584,549 | 12/1996 | Lybarger et al. . | |
| 5,586,003 | 12/1996 | Schmitt et al. . | |
| 5,587,877 | 12/1989 | Ryna et al. | 312/223.2 X |
| 5,593,220 | 1/1997 | Seid et al. . | |

Primary Examiner—Peter M. Cuomo
Assistant Examiner—Janet M. Wilkens
Attorney, Agent, or Firm—Robert E. Bushnell, Esq.

[57] ABSTRACT

A protecting device for an electronic peripheral device, the protecting device having a front cover, mounted on a front surface of the housing for the electronic peripheral device and a door which is opened or closed depending on whether the peripheral equipment needs to be used. The door is pivotally connected to both sides of the front cover such that it protects the peripheral equipment from being damaged. A controlling device is are provided for controlling the opening speed and opening degree of the door. The controlling device includes a rotating shaft inwardly disposed in a lower end of the front cover, both ends of which pass through both sides of the front cover and are inserted into each concavity respectively formed on leg portions of the door; a pair of brakes mounted opposite to each other on the rotating shaft, the brakes contacting a rib formed on the rotating shaft and having guide notches formed on each side thereof so that the rib can move up and down in accordance with the rotation of the rotating shaft; and elastic members disposed respectively between lateral walls formed on the inner surface of the front cover and outside faces of the brakes such that the biasing force of the elastic members is applied to the brakes.

13 Claims, 7 Drawing Sheets

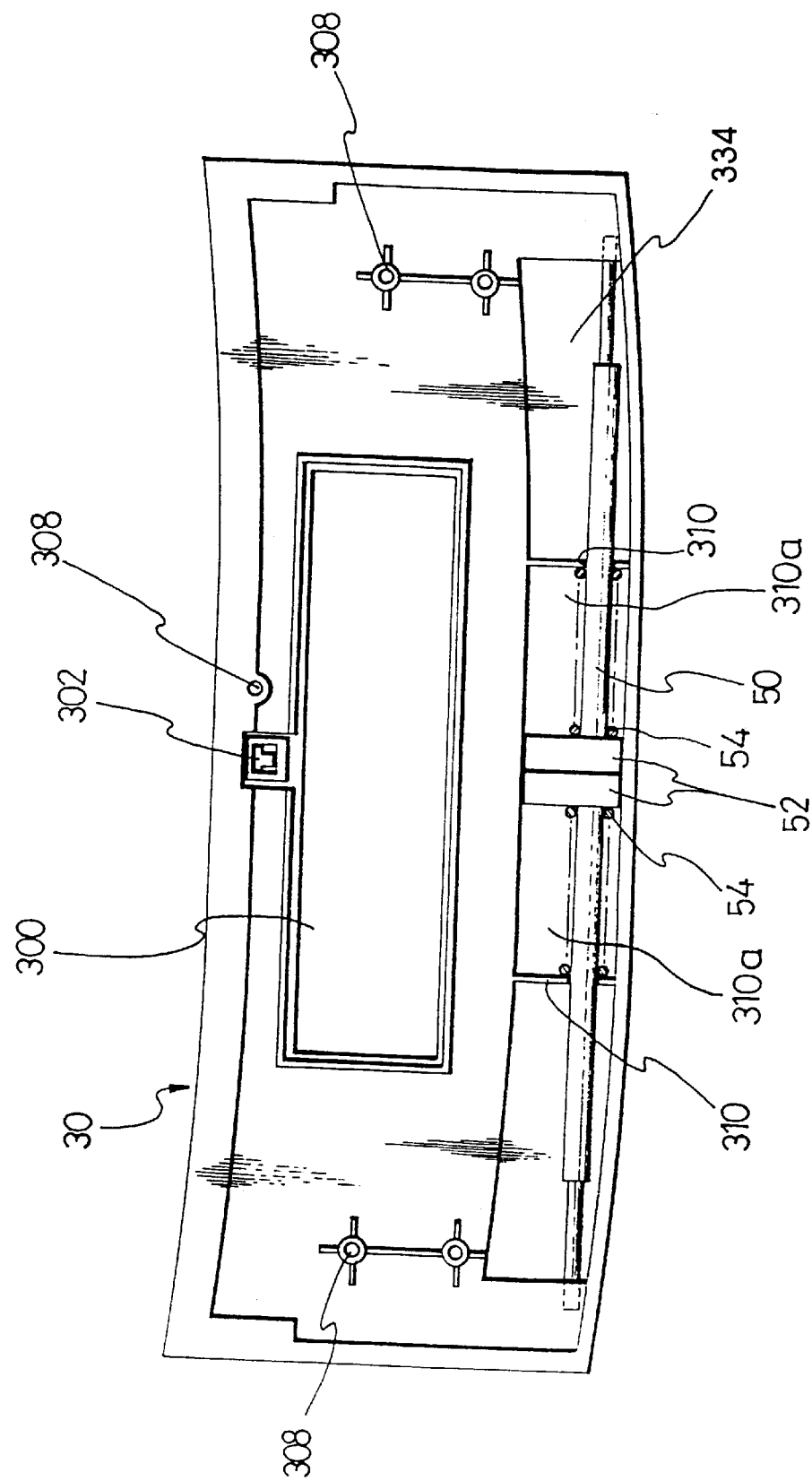

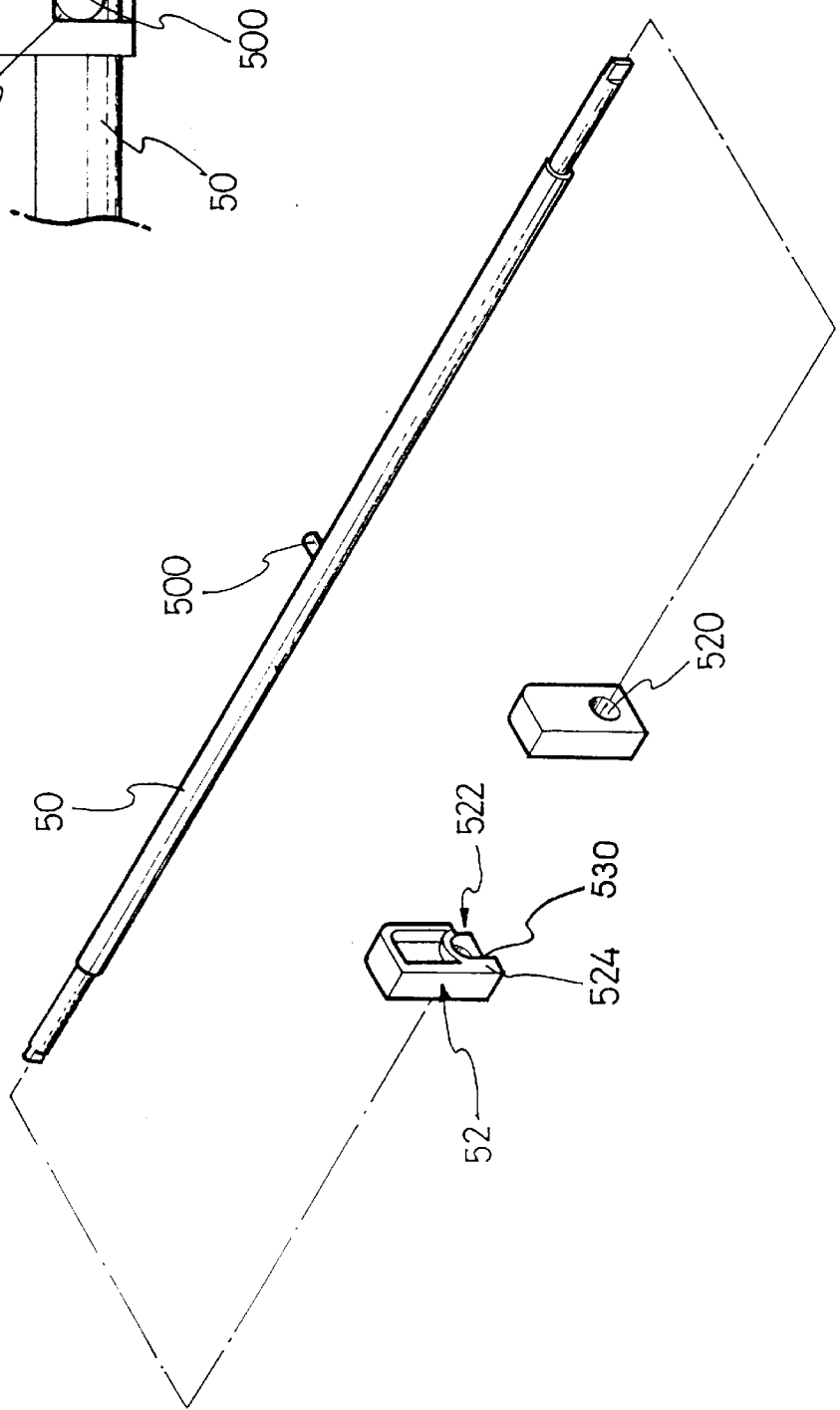

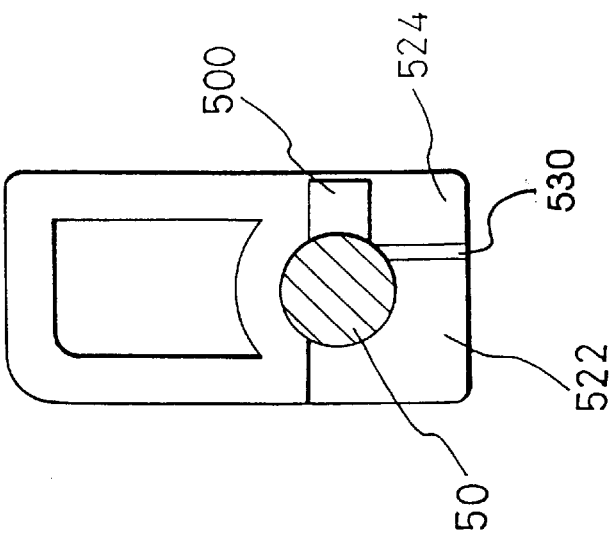
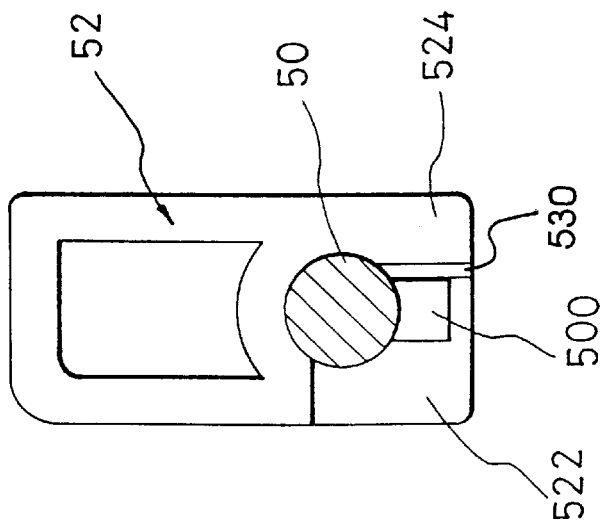
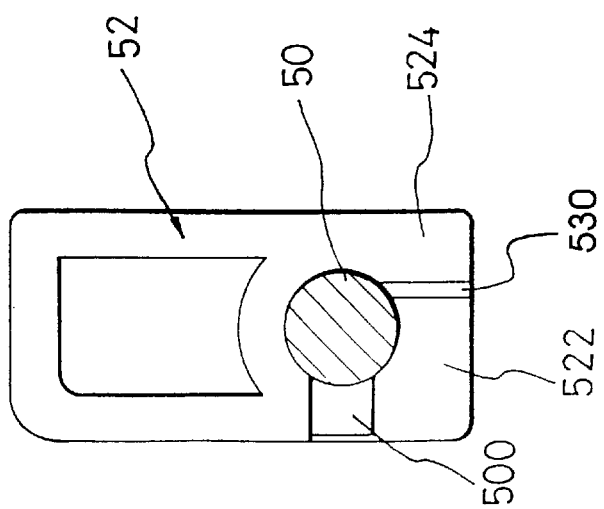

COMPUTER HAVING PROTECTING MEANS FOR PERIPHERAL EQUIPMENT

CLAIM OF PRIORITY

This application makes reference to, incorporates the same herein, and claims all benefits accruing under 35 U.S.C. §119 from an application for A COMPUTER HAVING PROTECTING MEANS FOR PERIPHERAL EQUIPMENT earlier filed in the Korean Industrial Property Office on Apr. 3, 1996 and there duly assigned Ser. No. 10016/1996.

BACKGROUND OF THE INVENTION

1. Field of the Invention

The present invention relates to a computer having front cover for peripheral equipment, and more particularly, to a computer having front cover for peripheral equipment which prevents the peripheral equipment from being damaged by inhibiting the entrance of foreign substances like dust or motes into the inside of the computer.

2. Description of the Related Art

Generally, computers are furnished with various peripheral equipment such as a floppy-disk drive, provided as an auxiliary storage device to write and/or read data on/from a floppy disk.

Such peripheral equipment is installed internally or separately from the main body of a computer. The diskette slot of the floppy disk drive is exposed outwardly from the corresponding computer unit to allow for the reception of a floppy disk. Because of the vulnerability to dust and other foreign substances with is structure, a prior art computer is furnished with a protecting device. The protecting device is generally a door which is installed on a front surface of a chassis portion of the computer unit. This door is installed so as to shield the diskette slot when the user is not using the computer, and the door is slidably installed such that it can be mounted and dismounted from the computer, or the door is pivotally installed on one side thereof. Thus, the diskette slot can be accessed by sliding or pivoting the door, and covered, to prevent the inflow of dust, by returning the door to the initial position.

The use of a door to protect peripherals is found in U.S. Pat. No. 5,574,625 for a Portable Information Processing Apparatus Having Multiple Rotatable Port Covers to Ohgami et al., which shows a portable information processing apparatus having multiple rotatable port covers. Numerous covers are used to gain access to various peripheral equipment in the portable computer. U.S. Pat. No. 5,557,499 for a Hard-Disk Drive Tray Assembly With Pivotally Rotatable Front Bezel to Reiter et al discloses a hard disk drive tray assembly with pivotally rotatable front bezel. The bezel has a built-in handle which allows a user to securely grasp onto the hard disk drive tray assembly during transportation from one location to another. The bezel is open or closed and is used in the hard disk drive.

U.S. Pat. No. 5,586,003 for a Computer Device Carrier Door and Bay Filler Panel Combination Gear and Guide Pin to Schimitt et al. discloses a computer device carrier door and bay filer panel combination including gear and guide pin. In order to provide insulation against dirt and dust invasion, and to restrict individuals from inserting foreign objects into the chassis which could cause catastrophic failure to the system, the carriers are often provided with doors which serve to seal the bay after the device insertion. The mount has a pinion gear to rotatably engage the rack as a door is opened and closed and a guide pin which enters the open end of the channel door when the door is open and travels within the channel as a door is opened and closed.

U.S. Pat. No 5,593,220 for a Cantilevered Latch Mechanism for An Enclosure to Seid et al. discloses a cantilevered latch mechanism for an enclosure. For a personal computer having a latch and release mechanism having at least two parallel cantilevered arms that allow the mechanism to have both strength for holding the enclosure to the computer and restrained flexibility that causes the distal end of the latch and release mechanism to travel translationally for releasing the enclosure.

U.S. Pat. No. 5,423,605 for a Front Panel Structure For a Personal Computer to Liu discloses a front panel structure for a personal computer. By depressing resilient hooking members opening the front panel can easily be removed from the computer casing. If a sliding door is used, the utilization of such a device is cumbersome, and if a pivoting door is used, because the door is supported only on one of its sides, it is easily broken when the door is subjected to an outside shock. I have found that in the latter case, the door does not open in a smooth and controlled fashion because the pivoting speed of the door is not controlled. This acts to diminish the overall quality of the computer unit.

SUMMARY OF THE INVENTION

The present invention has been made in an effort to solve the above problems.

It is an object of the present invention to provide a computer having a protecting device for peripheral equipment, with a solid construction to guard against damage from outside shocks, and to provide a smooth opening action and thereby improve the overall quality of the computer.

To achieve these and other objects, the present invention provides a computer constructed with a computer unit in which peripheral equipment is installed, a front cover, mounted on a front surface of the computer unit, and a door which is opened or closed depending on whether the peripheral equipment needs to be used. The door is pivotally connected to both sides of the front cover such that it protects the peripheral equipment from being damaged.

Also, a control is provided for controlling the opening speed and opening degree of the door. The control means includes a rotating shaft inwardly disposed in a lower end of the front cover, both ends of which pass through both sides of the front cover and are inserted into each concavity respectively formed on leg portions of the door; a pair of brakes mounted opposite to each other on the rotating shaft, the brakes contacting a rib formed on the rotating shaft and having guide notches formed on each side thereof so that the rib can move up and down in accordance with the rotation of the rotating shaft; and elastic members disposed respectively between lateral walls formed on the inner surface of the front cover and outside faces of the brakes such that the biasing force of the elastic members is applied to the brakes.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIG. 3 is a rear view of a front cover constructed in accordance with the principles of the present invention;

FIG. 4 is an exploded perspective view illustrating a rotating shaft and brakes constructed in accordance with the principles of the present invention;

FIG. 5 is a front view illustrating the rotating shaft and the brakes in a combined state in accordance with the principles of the present invention;

FIGS. 6A, 6B, and 6C are views used to describe the operation of the present invention;

DETAILED DESCRIPTION OF THE INVENTION

Figure 1:
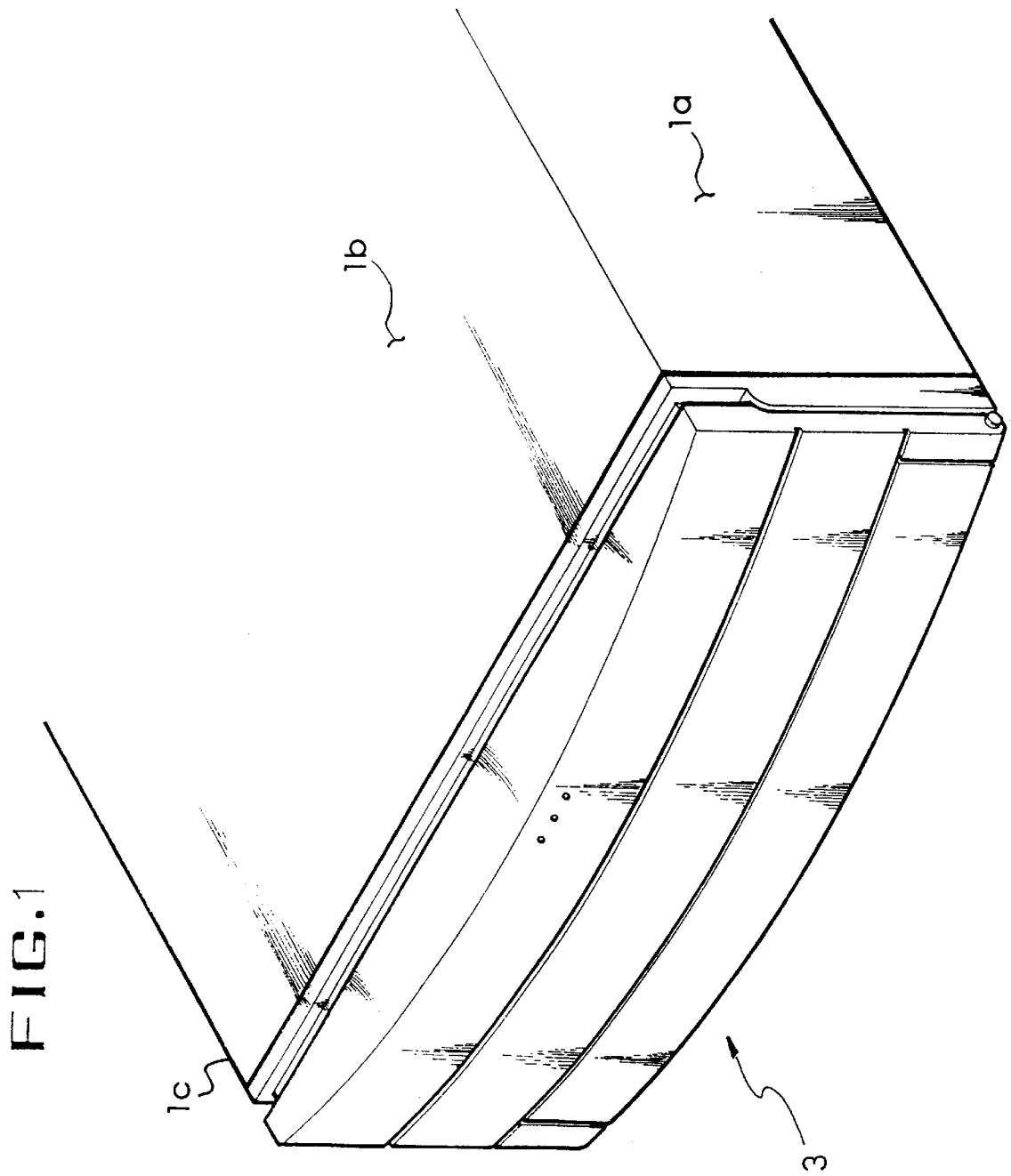
FIG. 1 is a perspective view illustrating a protecting device for peripheral equipment constructed as a preferred embodiment of the present invention adapted to a computer unit.

Referring now to FIG. 1, there is shown a perspective view illustrating a protecting device for peripheral equipment in accordance with a preferred embodiment of the present invention adapted to a computer unit. The reference numerals 1a, 1b, and 1c indicate a housing for a computer unit to which peripheral equipment is installed. In this embodiment, the housing 1a, 1b, and 1c is provided with peripheral equipment (i.e., a floppy disk drive, not shown). The housing 1a, 1b, and 1c may be constructed with a bottom chassis portion and a top cover, and a protecting device 3, positioned in front of the chassis portion and top cover, to protect the peripheral equipment.

Figure 2:
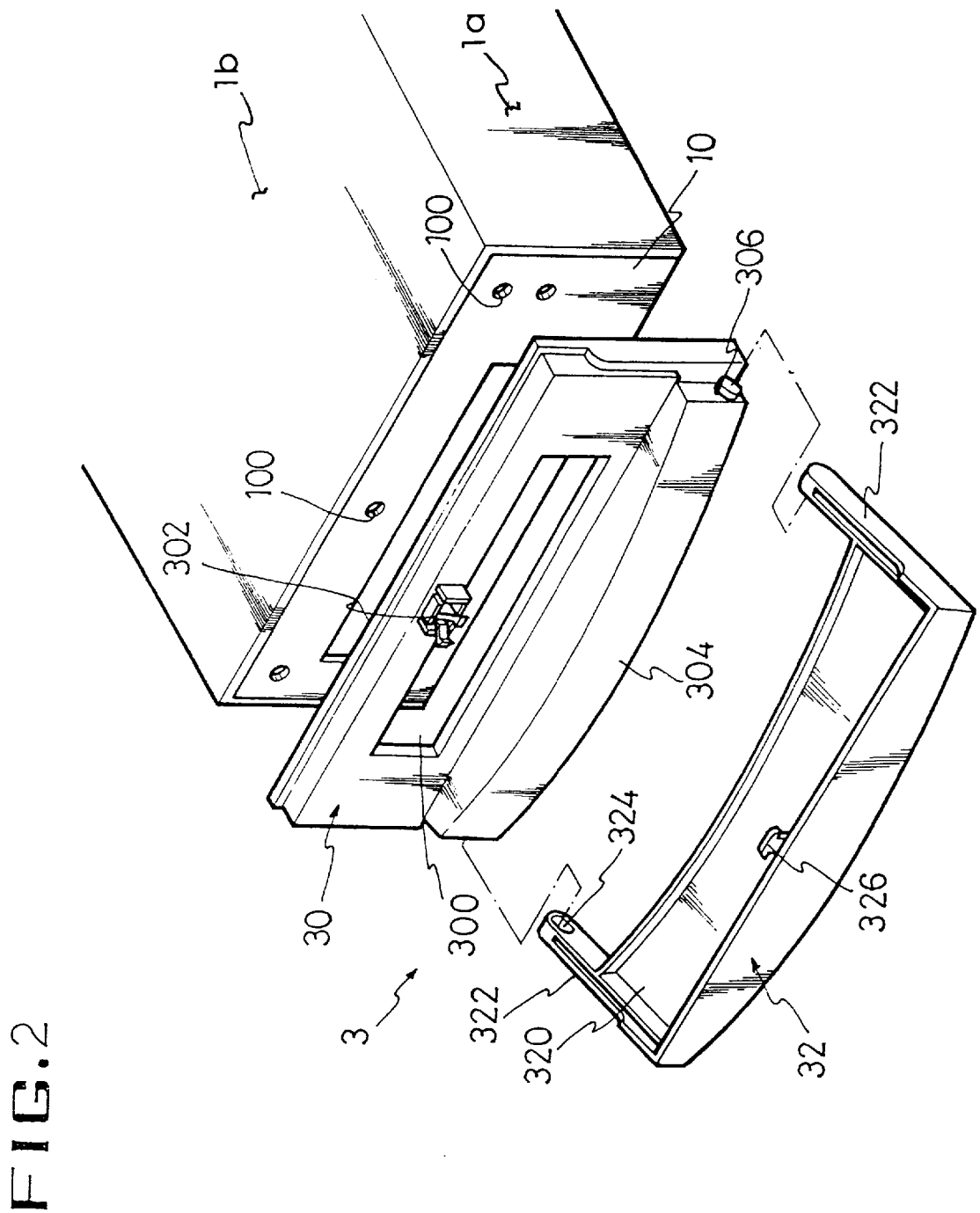
FIG. 2 is an exploded perspective view illustrating a protecting device for peripheral equipment in accordance with a preferred embodiment of the present invention.

As shown in FIG. 2, the protecting device 3 may have a front cover 30 mounted on the computer unit 1 through bolts, and a door 32 pivotally engaged on each side of a bottom portion of this front cover 30. The front cover 30 is provided with a cover window 300 corresponding to the location and size of the floppy disk drive, and a push-button type locking section 302 employing a conventional push-button locking structure located on a top front surface of the cover 30 above the cover window 300. Also, a projection 304 is provided below the cover window 300 having a substantially hollow area, and holes 306, which are hollow, are formed on each side the projection 304.

As shown in FIG. 3, nuts 308 are integrally formed in a back side of the front cover 30, the front cover 30 combining with the housing 1a, 1b, and 1c by means of bolts (not shown) coupled with the nut portions 308 through bolt-inserting holes 100 (see FIG. 2) formed on the bottom chassis portion of the housing 1a, 1b, and 1c.

Referring again to FIG. 2, the door 32 of the protecting device 3 is pivotally engaged with the front cover 30, pivoting in up and down directions such that the door 32 opens or shields the cover window 300. To accomplish the pivoting action, the door 32 is provided with leg portions 322 extendedly formed on each side of a front cover portion 320, and concavities 324 formed on an inner surface of each leg portion 322. Also, a latch 326 is integrally formed on an inner surface of the front cover portion 320. The latch 326 is able to be combined with the push-button type locking section 302 to provide a latch mechanism for door 32. When the door 32 is closed, the latch 326 secures door 32 in a closed position by engaging with the push-button type locking section 302. By manually moving the door 32 towards the front cover 30, latch 326 is disengaged from push-button locking section 302 to release the door 32 from the front cover 30 to permit opening of door 32.

In the practice of the present invention, there is also provided a control mechanism for controlling the opening speed and state of the door 32. As shown in FIG. 3, the control mechanism has a rotating shaft 50 inwardly disposed in the hollow area 334 behind projection 304. The rotating shaft 50 is supportably fitted into inserting portions 310a of lateral walls 310 formed at fixed intervals on an inner surface of the projection 304. Both ends of the rotating shaft 50 pass through the holes 306, allowing the ends of the rotating shaft 50 to be inserted in the concavities 324 of the door 32. The rotating shaft 50 rotates together with the rotation of the door 32.

A pair of brakes 52 are mounted on the rotating shaft 50 at a central portion, the brakes 52 being positioned adjacent to one another. As shown in FIG. 4, combination holes 520 are formed in each of the brakes 52 on a lower part thereof for combining with the rotating shaft 50, and guide notches 522 are provided on the brakes 52 for combining with a rib 500 formed in the center of the rotating shaft 50, the guide notches 522 being disposed adjacent to the combination holes 520. The brakes 52 are positioned from outside ends of the rotating shaft 50 such that the guide notches 522 for each brake 52 come to be adjoining, and the rib 500 is inserted into the guide notches 522 as shown in FIG. 5, which is a view in which the brakes 52 and the rotating shaft 50 are shown from the front side of the front cover 30.

Referring again to FIG. 3, the brakes 52 combine with each other on the rotating shaft 50 and they are maintained in tight engagement with each other by being elastically biased with elastic members 54 mounted circumferentially on the rotating shaft 50 between the lateral walls 310 and the outside of each brake 52.

The operation of the present invention structured as described above will be detailed hereinafter. When housing 1a, 1b, and 1c is not being used, the door 32 is kept closed as shown in FIG. 1. That is, the cover portion 320 shields the cover window 300. In this state, the rotating shaft 50 maintains a state as shown in FIG. 6A in which the rib 500 of the rotating shaft 50 points in the direction of the front surface of the front cover 30.

Figure 7:
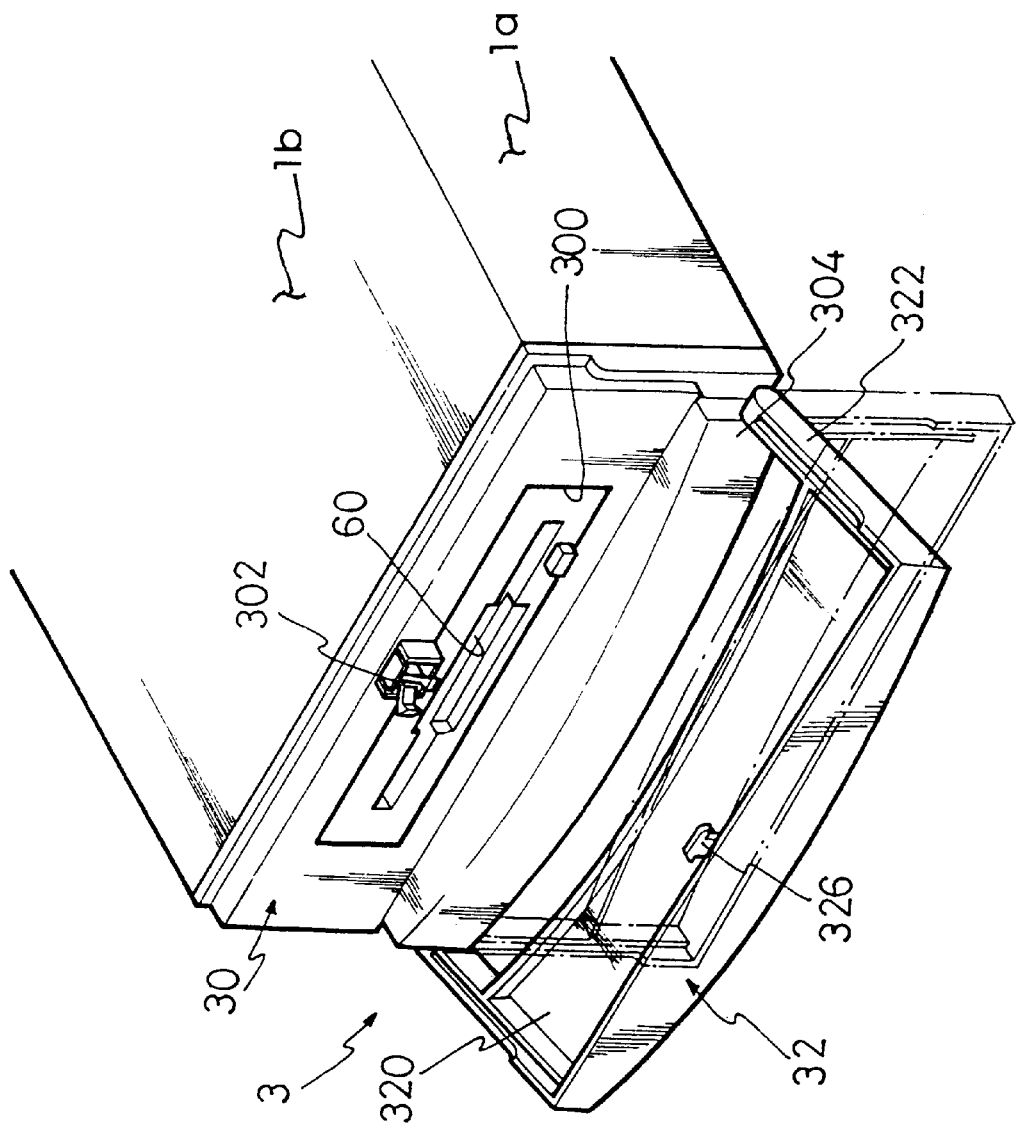
FIG. 7 is a perspective view illustrating different open states of the door in accordance with the practice of the present invention.

From the above state, if the user desires to use the floppy disk of the computer unit 1, the door 32 is pushed by the user, the action of which opens the door 32 by the release of the latch 326 from the push-button type locking section 302. When this is done, the door 32 is released from the front cover 30 and partly opens as shown in the solid line of FIG. 7. That is, the door 32 opens to only to a predetermined level and does not completely fall downwardly. This is realized by the rib 500 of the rotation shaft 50 making contact with protruding portions 524, formed on lower and rear portions of the bakes 52. As a result the rotation shaft 50 is prevented from further opening since protruding portions 524 of the brakes 52 block further movement of the rib 500, as shown in FIG. 6B.

In the above, the rib 500 rotates within the guide notches 522, the outer circumferential surface of the rib 500 making contact with side walls of the guide notches 522, generating frictional force. This frictional force reduces the rotating speed of the rotating shaft 50. This results in the smooth opening of the door 32. Here, the brakes 52 maintain their mutual engagement, as shown in FIG. 3, since the brakes 52 are subject to the biasing force of the elastic members 54. When the door 32 opens as described above, the user can use the computer, inserting a diskette into the diskette slot 60 through the cover window 300. In this opened state, if the user inadvertently hits the door 32, the door 32 further pivots downwardly, converting to an open state as shown in the dotted line of FIG. 7. This prevents the door from being broken.

Figure 8:
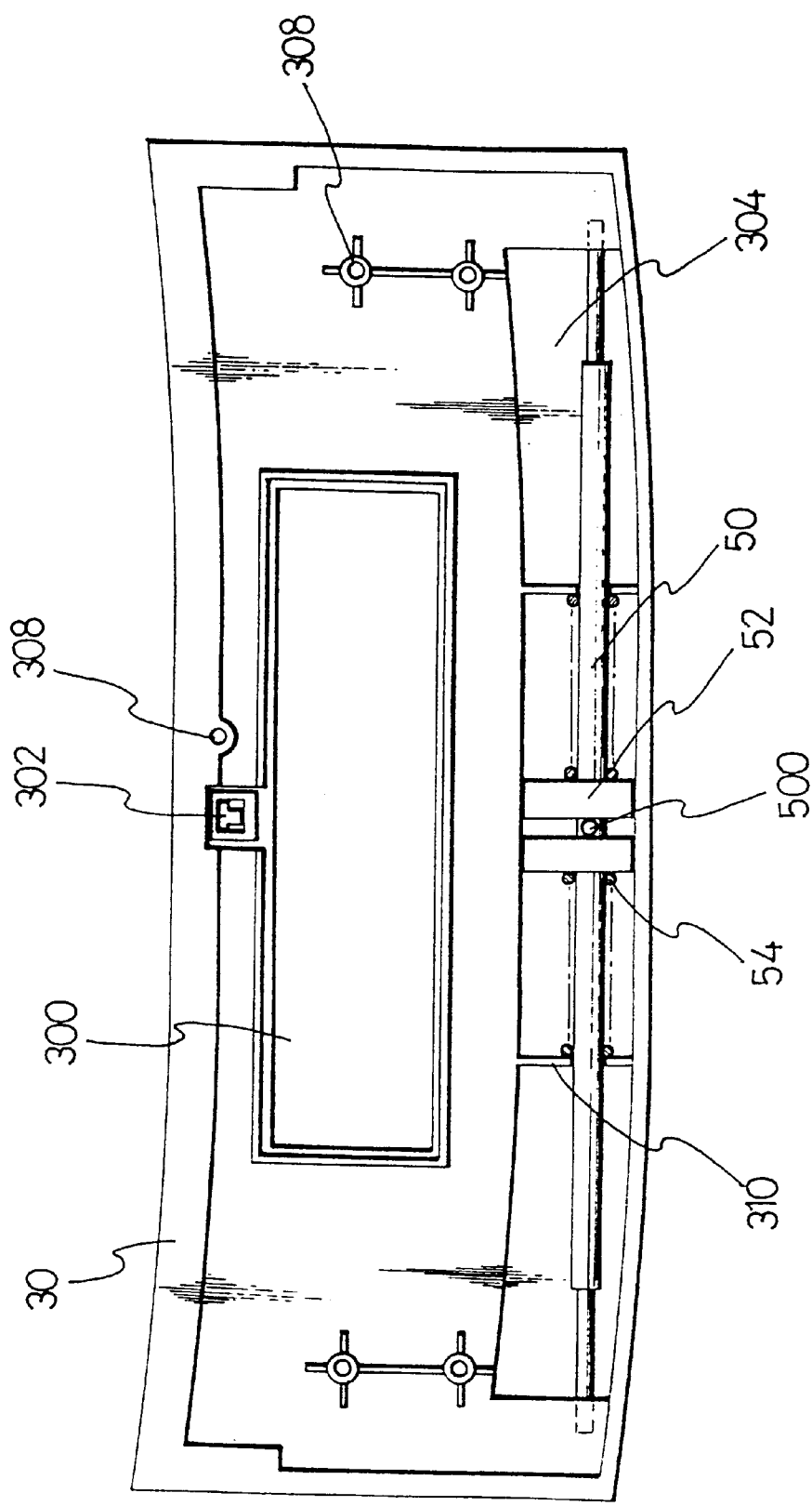
FIG. 8 is a rear view of a front cover used to describe the operation of the present invention.

The above secondary open state is realized by the brakes 52 spreading apart. That is, the rotating shaft 50 rotates (see FIG. 8) such that the rib 500 which was blocked by each protruding portion 524 of the brakes 52 in FIG. 6B further rotates in a counterclockwise direction and is disposed between both brakes 52 after passing over each protruding portion 524 of the brakes 52 as in FIG. 6C. The rib 500 can easily pass over the protruding portions 524 since the rib 500 is in contact with an inclined plane 530 of each protruding portion 524 and because the elastic members 54 give to allow the brakes 52 to spread apart.

Therefore, when the door 32 is subjected to any outside shocks when in the above-described first open state, the door 32 converts from the first open state to the secondary open state, thus preventing the door 32 from being broken. When the user finishes work on the computer, the user closes the door 32 upwardly and pushes on the same such that the latch 326 is combined with the push-button type locking section 302 as shown in FIG. 1. As a result, when the computer of the present invention is not being used, the floppy disk drive can be protected by closing the door 32 as described above such that the cover window 300 and, consequently, the diskette slot 60, can be covered by the door 32 to prevent the inflow of foreign substances like dust.

While the above embodiment according to the present invention is provided relating to a door of a floppy-disk drive, the present invention may be applied to other peripheral equipment such as CD-ROM drives, DVA-ROM drives, hard disk drives, and the like. Furthermore, the foregoing description of the embodiment according to the present invention regarding a computer is provided for illustration only, and not for the purpose of limiting the invention as defined by the appended claims and their equivalents.

The computer having a protecting device for peripheral equipment in accordance with the present invention has the advantage of improving the overall quality of the computer by enabling a door, mounted to protect peripheral equipment such as a floppy disk drive, to open smoothly. Further, by allowing the door to further open from the first open position to the second open position, the door is prevented from being broken when it receives an outside shock.

What is claimed is:

1. A device, comprising:
    a front panel positioned on a housing for an electronic peripheral device and allowing access to the inside of the housing,
    a door attached to said front panel, said door preventing access to the inside of the housing when said door is in a closed position;
    a latch mechanism securing said door in said closed position, said door being released from said closed position by disengaging said latch mechanism in response to manual movement of said door towards said front panel; and
    control means for controlling an opening speed and a degree of opening of said door, said control means comprising:
    a hinge pin inserted through a projecting portion of said front panel with opposite end portions of said hinge pin extending beyond oppositely spaced-apart side walls of said projecting portion of said front panel;
    said door being attached to said opposite end portions of said hinge pin allowing said door to pivot about said front panel;
    a rib centered on and protruding from said hinge pin; and
    brake means having a pair of abutting brake pads respectively disposed in opposing relation on opposing sides of said rib and having frictional contact with said rib to control said opening speed and degree of opening of said door.

2. The device of claim 1, wherein:
    said pair of brake pads each has a tapered edge, said rib contacting each said tapered edge when said door is in a fully open position, said rib forcing said pair of brake pads apart when said door is rotated past said fully open position, and thereby separating said pair of brake pads.

3. The device of claim 2, wherein said hinge pin further comprises biasing means for forcing said pair of brake pads toward each other.

4. The device of claim 3, wherein said biasing means comprises a pair of springs and a pair of lateral walls formed in a cavity of said projecting portion of said front panel.

5. A device, comprising:
    a door;
    a panel;
    a hinge pin supported by said panel, said door being attached to said hinge pin allowing said door to pivot about said panel;
    a rib positioned on and protruding from said hinge pin; and
    brake means disposed to have frictional contact with said rib to control an opening speed and a degree of opening of said door.

6. The device of claim 5, wherein said brake means has a pair of abutting brake pads respectively disposed in opposing relation on opposing sides of said rib.

7. The device of claim 6, wherein
    said pair of brake pads each has a tapered edge, said rib contacting each said tapered edge when said door is in a fully open position, said ribs forcing said pair of brake pads apart when said door is rotated past said fully open position, and thereby separating said pair of brake pads.

8. The device of claim 7, wherein said hinge pin further comprises biasing means for forcing said pair of brake pads toward each other.

9. The device of claim 8, wherein said biasing means comprises a pair of springs and a pair of lateral walls formed in a cavity of said panel.

10. An electronic device, comprising:
    a main body;
    a door; and
    means for controlling an opening speed and a degree of opening of said door, said means for controlling comprising:
    a hinge pin inserted through a projecting portion of a front panel of said main body with opposite end portions of said hinge pin extending beyond oppositely spaced-apart side walls of said projecting portion of said front panel;
    said door being attached to said opposite end portions of said hinge pin allowing said door to pivot about said front panel;

a rib centered on and protruding from said hinge pin; and brake means having a pair of abutting brake pads respectively disposed in opposing relation on opposing sides of said rib and having frictional contact with said rib to control said opening speed and degree of opening of said door.

11. The electronic device of claim 10, wherein said pair of brake pads each has a tapered edge, said rib contacting each said tapered edge when said door is in a fully open position, said rib forcing said pair of brake pads apart when said door is rotated past said fully open position, and thereby separating said pair of brake pads.

12. The electronic device of claim 11, wherein said hinge pin further comprises biasing means for forcing said pair of brake pads toward each other.

13. The electronic device of claim 12, wherein said biasing means comprises a pair of springs and a pair of lateral walls formed in a cavity of said projecting portion of said front panel.

* * * * *